Oct. 8, 1957 J. A. PERSSON 2,809,278
METHOD AND APPARATUS FOR MAGNETICALLY-IMPELLED ARC WELDING
Filed Aug. 23, 1955 2 Sheets-Sheet 1
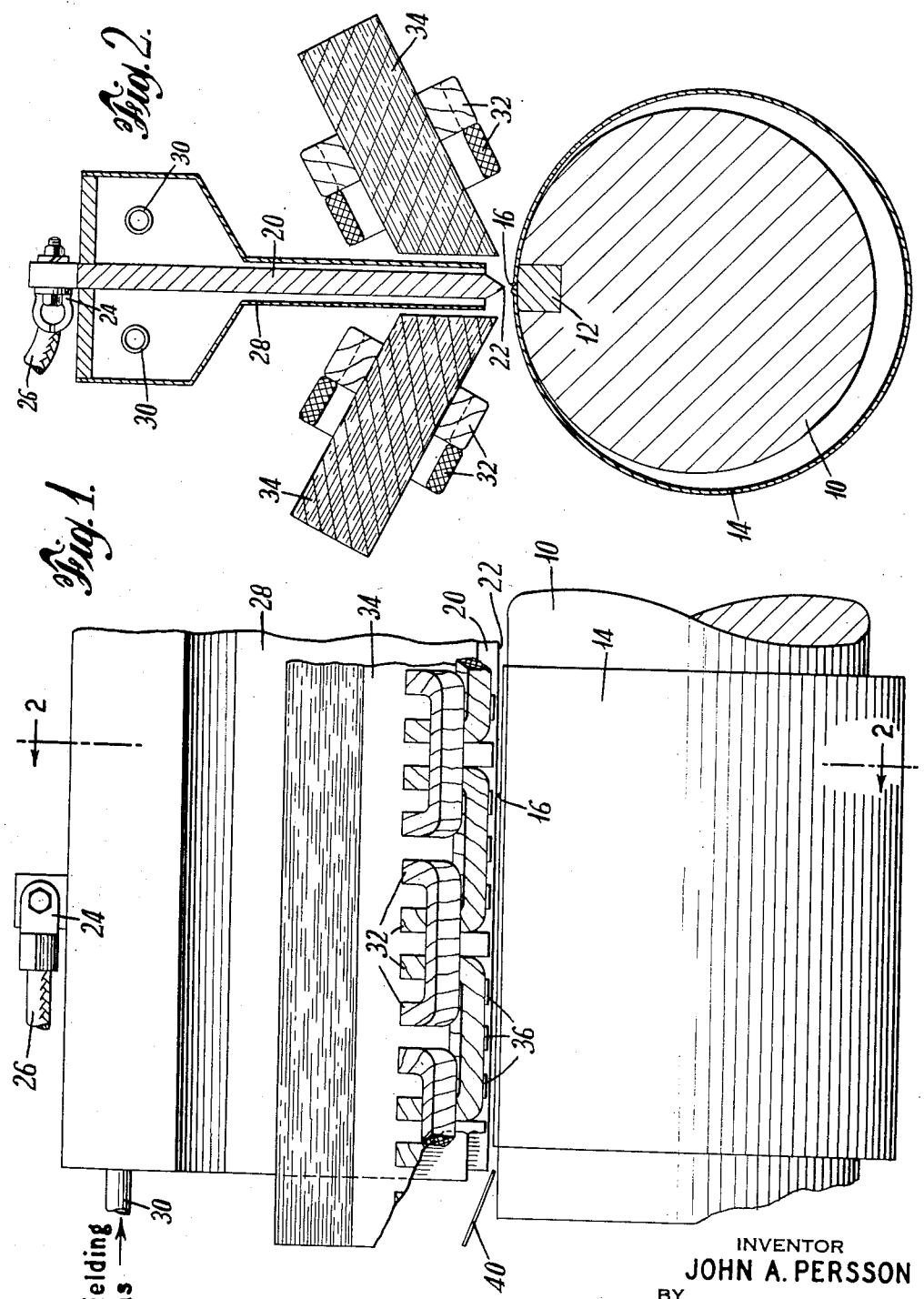
INVENTOR
JOHN A. PERSSON
BY
*Gerald R. O'Brien Jr.*
ATTORNEY

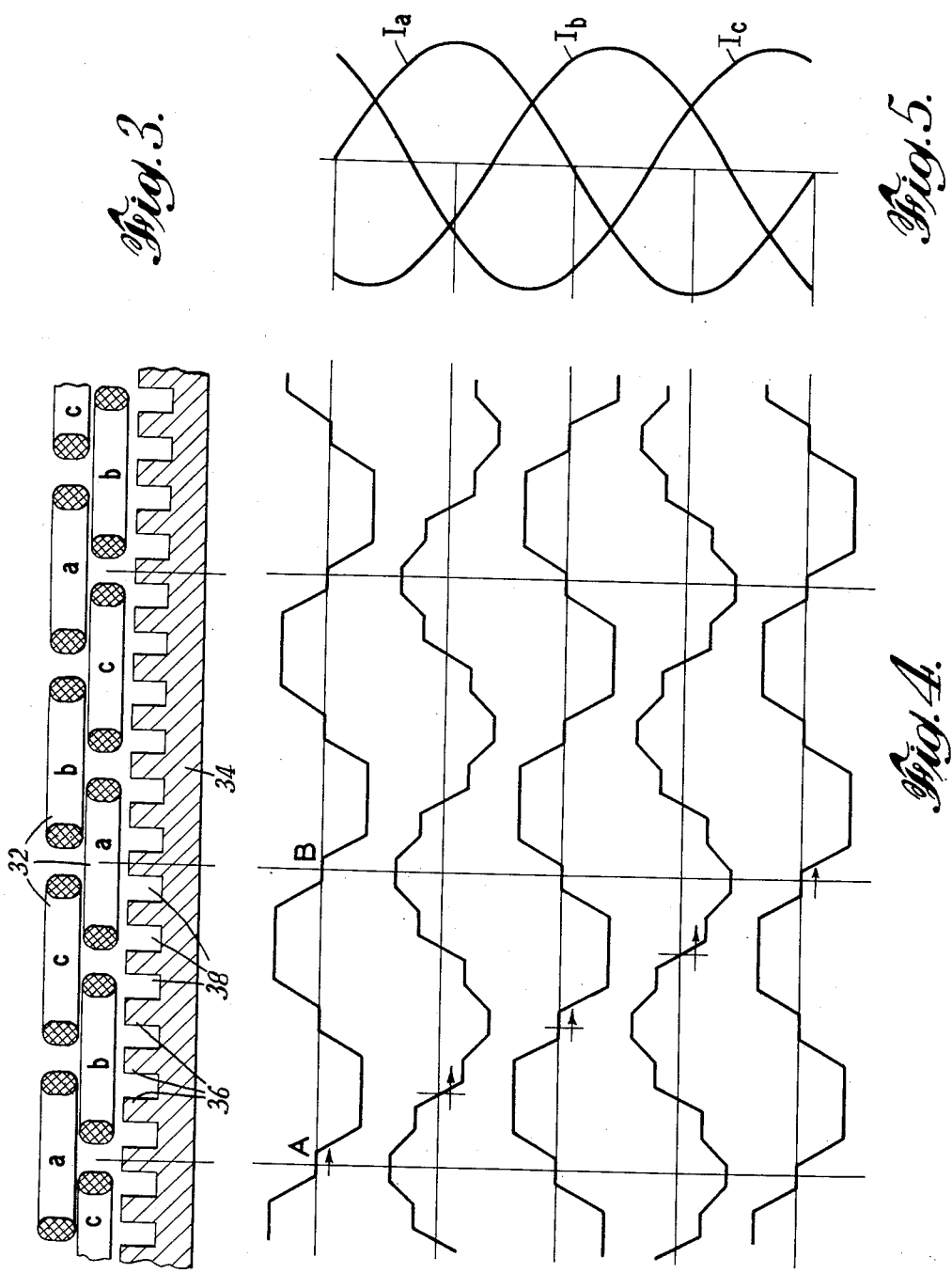

United States Patent Office 2,809,278
Patented Oct. 8, 1957

2,809,278

METHOD AND APPARATUS FOR MAGNETI-
CALLY-IMPELLED ARC WELDING

John A. Persson, Kenmore, N. Y., assignor to Union
Carbide Corporation, a corporation of New York Application August 23, 1955, Serial No. 530,171

8 Claims. (Cl. 219—123)

The present invention relates to a method and apparatus for magnetically-controlled electric arc welding and, more particularly, to such welding of thin metallic workpieces employing non-consumable metallic electrodes and inert gas shielding of the arc and welding zones.

In the high-speed fusion welding of thin metallic workpieces many problems of a mechanical, electrical, and thermal nature arise which limit the speed at which the welding operation can be performed. However, in order to incorporate fusion welding into continuous sheet metal production operations, high welding speeds and uniform weld quality are required. For example, in the production of can bodies, a production rate of 400 cans per minute on a bodymaker of conventional design is required, and the various forming and gaging operations on a single can must be completed in approximately 0.10 second, thus leaving about 0.05 second for the welding operation. Therefore, thin metallic stock forming a can body 5 inches in length must be welded at a speed of at least 6,000 inches per minute, in order to incorporate welding into the high-speed can forming operation without reducing the production rate below 400 cans per minute. Similarly, can stock requiring a weld 6½ inches long would require a welding speed of approximately 7800 inches per minute.

The problem of high-speed welding of thin metallic workpieces confronts not only the can-making industry, but others seeking to produce fusion welds in thin metallic workpieces at equally high speeds.

The welding current required at high welding speeds in the order of thousands of inches per minute is in the order of 1200 amperes or higher. These welding requirements exceed any conventional practice and many new problems are introduced when employing such high welding speeds and welding currents.

Heretofore, a gas-shielded thoriated tungsten electrode was moved, by mechanical means, along the seam to be welded. In order to produce a uniform weld it was necessary that the electrode move along the seam to be welded at a uniform velocity, a factor which was difficult to achieve at high welding speeds over the short welding lengths involved in that process. In any event, the welding speed in such process was limited by the mechanical movement of the electrode with respect to the workpiece, and this problem was even further complicated by the uniformity in electrode speeds required for producing uniform welds. Should the electrode speed be other than uniform, burn through or failure to fuse the workpiece tends to occur.

In addition, it has been found that an arc, established between an elongated non-consumable electrode and the workpiece can be impelled along the seam to be welded at a high speed under the influence of a moving permanent magnetic field of sufficient strength. Field control of the speed of the welding arc has been obtained up to 3100 inches per minute employing such a process. The speed was only limited by the maximum obtainable speed of the hydraulic system driving the permanent magnets.

While such a process can satisfactorily accomplish welding of thin metallic workpieces at speeds up to about 3100 inches per minute, the mechanical limitations of the process prevent its application to welding operations requiring higher speeds, such as those discussed hereinabove. In addition, the use of any mechanical system to obtain arc motion with respect to the workpiece presents the problem of uniform weld quality.

It is, therefore, the prime object of the present invention to provide a method and apparatus for impelling an arc in the welding of thin metallic workpieces, wherein such mechanical limitations are not encountered.

Other aims and advantages of the present invention will be apparent from the following description and appended claims.

In accordance with the present invention, a method is provided for the welding or fusing of thin metallic workpieces comprising, providing, in series with an electric power source and the workpiece, an elongated non-consumable stationary electrode having its lower edge positioned above and parallel to the seam to be welded, forming an arc between one end of the electrode and the workpiece, developing in stationary electrical windings a magnetic field transverse to the arc and travelling in the direction to be welded, and subjecting the arc to the influence of such travelling magnetic field to impel the arc between the electrode and workpiece at a uniform velocity along the seam to be welded. Concurrently with the welding operation, the entire length of electrode and weld zone are shielded with an atmosphere of substantially inert gas in the manner well known to the art to exclude atmospheric contamination. Due to the high welding speeds and short weld lengths employed, it has been found preferable to shield the arc of the entire weld seam during the entire welding operation, rather than attempting to shield only the zone around the arc and the moving molten weld puddle.

By impelling the arc across the electrode and along the seam to be welded in accordance with the invention, extremely high welding speeds at uniform velocity can be obtained. The method has been employed to weld thin metallic workpieces at speeds greater than 7200 inches per minute. In theory, it is believed that the upper limit of welding speed is of the order of about 150,000 inches per minute for the method of the invention, the limitation depending on electrical rather than mechanical considerations.

It has been found that arc ignition between the one end of the elongated stationary electrode and the workpiece, as well as arc extinction, may be accomplished by any one of the three following methods: (1) employing an auxiliary electrode supplied with high-frequency from a spark-gap oscillator, or the like, (2) employing an auxiliary electrode supplied with a single pulse of high-voltage current, or (3) by shortening the gap at the point in which it is desired to initiate the arc and by superimposing a high-frequency voltage on the conductor to the electrode. It is, of course, to be understood that other suitable arc ignition and quenching procedures well known to the art may be employed.

Any magnetizing current capable of establishing in a field winding a travelling magnetic field may be employed in the method of the invention. Specifically, it has been found that a 60-cycle, 3-phase alternating current in the field windings described below is capable of impelling a welding arc at speeds greater than 7200 inches per minute at uniform velocities.

The travelling speed of the magnetically-impelled arc, equal to the speed of the travelling magnetic field, is a function of the product of the frequency of the alternating magnetizing current and the distance between two poles in the field winding. For example, for 60-cycle alternating current, where the distance between two poles is two inches, the travelling speed of the magnetic field will be 7200 inches per minute. Variable speed control can be obtained by employing a variable frequency converter for current supply to the winding, or by employing coils of different design for different welding operations.

An embodiment of apparatus suitable for performing the welding method of the present invention is shown in the drawings, wherein:

Fig. 1 is a partial elevational view of such welding apparatus;

Fig. 2 is a sectional view taken along the line 2—2 of Fig. 1;

Fig. 3 is a vertical cross-sectional view of the magnetic field windings of the apparatus shown in Figs. 1 and 2;

Fig. 4 is a sketch showing the direction and magnitude of magnetic flux produced in the windings at four different time intervals during one cycle of the alternating magnetizing current; and Fig. 5 is a schematic showing the variations in current in each of the three phases of the windings with respect to time.

Referring specifically to the embodiment shown in the drawing, a mandrel 10 of stainless steel or the like, provided with a back-up bar 12 of copper or other suitable material, is provided for supporting the workpiece at the seam to be welded. The workpiece 14, such as formed can stock having a thickness preferably less than 0.05 inch and having edges to be joined flanged as at 16, is supported on mandrel 10. An elongated metal electrode 20 of copper or the like, having a lower chiseled edge 22 of tungsten inserted in the copper, is positioned above and in close alignment over the flanged edges 16 of the workpiece 14 to be welded. Current is supplied to the electrode 20 through clamp 24 and conductor 26, and the welding circuit is completed through a suitable electric welding power source (not shown) and a conductor (not shown) to the workpiece 14, the mandrel 10, or the back-up bar 12. It is important that all portions of the lower edge of the electrode be substantially equally positioned from the workpiece to provide a uniform spacing therebetween which will enable the arc to traverse the workpiece along the seam at a uniform speed under the influence of the travelling magnetic field. Should the spacing between electrode and workpiece vary appreciably, the welding speed may not be uniform and may even result in the inability of the arc to traverse the full length of the electrode.

Surrounding the electrode is provided conduit means, including manifold 28, for the introduction of a stream of shielding gas about both sides of the electrode 20 and the discharging of such streams around the entire length of the electrode and workpiece along the seam to be welded. Any suitable shielding gas known to the prior gas shielded electric arc welding art may be employed and is introduced into manifold 28 through inlet conduits 30.

Magnetizing windings 32 are provided in a laminated magnetic core 34 having teeth 36 and slots 38 similar to the armature of an electric motor. Such assembly of windings 32 and core 34 is positioned on either or both (as shown in the drawing) sides of the electrode 20 in close proximity to the workpiece so as to subject the electric arc to a travelling magnetic field having its field intensity transverse to the arc to produce a resultant force on the arc in the direction of the seam to be welded. As shown in the drawing, a 3-phase alternating magnetizing current is impressed on the 3-phase winding, such as shown in Fig. 3 of the drawing, the three phase windings there having assigned the letters a, b, and c. The travelling speed of the magnetic field in the direction of seam to be welded is determined, as described hereinabove, by the product of the frequency of magnetizing current and the spacing between poles of the same phase. Thus, where the frequency is 60-cycle per second and the distance between two poles of the same phase is two inches, this speed will be 2×60=120 inches per second, or 7200 inches per minute.

A high frequency spark electrode 40, of tungsten or the like, is provided and located at one end of the main electrode for initiating the welding arc.

Referring specifically to Figs. 3, 4 and 5 of the drawing, a winding 32 is provided having three overlapping phase coils, a, b, and c, respectively, mounted in slots 38 and carrying the 3-phase currents Ia, Ib, and Ic, respectively. Fig. 5 of the drawing shows the variation of these currents in amplitude and phase with respect to time. Fig. 4 of the drawing is a sketch indicating the direction of the resultant magnetic flux produced by the coils at four different time intervals during one cycle of the alternating current. As may be seen from this sketch, the resultant wave of magnetic flux travels continuously from left to right. It has been found that, by reversing one of the currents, the direction of travel can be reversed. If a direct current arc of the proper polarity is initiated at a point of zero field strength, for instance the point A, the magnetic field to the left of the arc will tend to impel the arc in a direction to the right, whereas the field to the right of the arc will tend to impel the arc to the left. Thus, the arc will be stabilized at point A. However, when the wave of magnetic flux travels from left to right the arc will be synchronized with this magnetic flux travel and carry across the seam to be welded by the travelling magnetic flux, provided that the magnetic field strength is sufficient to overcome the normal tendency of the arc to remain static. As described hereinabove, the speed of the magnetic field, and thus the speed of the arc, is determined by the product of the frequency of the alternating magnetizing current and the distance between two poles of the same phase. This latter value is indicated as the distance from points A to B in Fig. 4 of the drawing, or a distance between the identical points in a phase winding 32.

In an example of the welding method of the invention, apparatus similar to that shown in the drawing was employed to weld 0.01-inch steel sheets at a welding speed of 7200 inches per minute. The welding current was 1200 amperes D. C. and the voltage 30 volts. The arc was initiated by high frequency means and the magnetic field energized with a 60-cycle, 3-phase alternating current of 3 amperes to produce a magnetic field of the order of 180 gauss R. M. S. in each coil. The entire welding operation was shielded with a stream of argon gas.

Welds of uniform quality have been made in a wide variety of thin metallic workpieces having thicknesses up to about 0.05-inch employing direct current welding sources connected to energize the welding circuit at both reverse and straight polarities.

The method of the present invention has been observed to accomplish a considerable reduction in electrode loss over that obtained in the prior art process employing a conventional gas-shielded thoriated tungsten electrode which is rapidly impelled across the work by mechanical means. This is brought about by the employment of the elongated stationary electrode across which the arc moves, resulting in a considerably reduced deterioration due to lower energy concentration at any given point along the electrode.

What is claimed is:

1. The method of fusing metallic workpieces comprising, providing, in series with an electric power source and the workpiece, an elongated non-consumable stationary electrode having its lower end positioned above and parallel to the seam to be fused; forming, at one end of said electrode, an arc between said electrode and said workpiece; setting up in stationary field windings a magnetic field transverse to said arc and travelling in the direction to be fused; subjecting said arc to the influence of said travelling magnetic field to impel said arc between said electrode and workpiece along said seam to be fused to fuse said workpiece; and concurrently shielding said arc and workpiece from the atmosphere.

2. The method of fusing metallic workpieces comprising, providing, in series with an electric power source and the workpiece, an elongated non-consumable stationary electrode having its lower end positioned above and parallel to the seam to be fused; forming, at one end of said electrode, an arc between said electrode and said workpiece; setting up in polyphase stationary field windings a magnetic field transverse to said arc and travelling in the direction to be fused; subjecting said arc to the influence of said travelling magnetic field to impel said arc between said electrode and workpiece along said seam to be fused to fuse said workpiece; and concurrently shielding said arc and workpiece from the atmosphere with a stream of substantially inert gas.

3. Apparatus for fusing thin metallic workpieces comprising, an electric power source connected in series circuit arrangement with workpiece supporting back-up means and with an elongated stationary non-consumable metal electrode having its lower edge positioned parallel to and at all points substantially equidistant from said back-up means, means for striking an arc between one end of said electrode and said workpiece supported in said back-up means, conduit means for supplying a stream of arc and fusion zone shielding gas along said seam to be fused, magnetic circuit means, including stationary field windings positioned in proximity with said workpiece and said electrode, for providing a travelling magnetic field transverse to both said arc and said electrode to impel said arc along said seam to be fused.

4. Apparatus in accordance with claim 3, wherein said elongated stationary electrode comprises a copper bar having a lower edge of thoriated tungtsen.

5. Apparatus in accordance with claim 4, wherein said shielding gas conduit means surrounds said stationary electrode and is adapted to discharge a stream of shielding gas on both sides of said electrode along the entire length of said electrode.

6. Apparatus for fusing thin metallic workpieces comprising, an electric power source connected in series circuit arrangement with workpiece supporting back-up means and with an elongated stationary non-consumable metal electrode having its lower edge positioned parallel to and at all points substantially equidistant from said back-up means, means for striking an arc between one end of said electrode and said workpiece supported in said back-up means, conduit means for supplying a stream of arc and fusion zone shielding gas along said seam to be fused, magnetic circuit means, including stationary polyphase field windings positioned on each side of said elongated stationary electrode in proximity with said workpiece and said electrode, for providing a travelling magnetic field transverse to both said arc and said electrode to impel said arc across said seam to be fused.

7. Apparatus in accordance with claim 6, wherein said elongated stationary electrode comprises a copper bar having a lower edge of thoriated tungsten.

8. Apparatus in accordance with claim 7, wherein said shielding gas conduit means surrounds said stationary electrode and is adapted to discharge a stream of shielding gas on both sides of said electrode along the entire length of said electrode.

References Cited in the file of this patent

UNITED STATES PATENTS

| | | |
|---|---|---|
| 483,425 | Coffin | Sept. 27, 1892 |
| 1,176,614 | Stanley | Mar. 21, 1916 |
| 1,524,714 | Kjekstad | Feb. 3, 1925 |
| 1,792,243 | Richter | Feb. 10, 1931 |
| 1,987,691 | Lincoln | Jan. 15, 1935 |
| 2,640,135 | Cobine | May 26, 1953 |